Nov. 8, 1966   K. FERTIG ET AL   3,284,795
ANGULAR RESOLVER

Filed March 31, 1964   6 Sheets-Sheet 1

INVENTORS
KENNETH FERTIG
JOHN F. HENDRICKSON
BY
ATTORNEYS

INVENTORS
KENNETH FERTIG
JOHN F. HENDRICKSON

FIG. 6

INVENTORS
KENNETH FERTIG
JOHN F. HENDRICKSON
BY
ATTORNEY

United States Patent Office 3,284,795
Patented Nov. 8, 1966

3,284,795
ANGULAR RESOLVER
Kenneth Fertig, 120 Colborne Road, Brighton, Mass., and John F. Hendrickson, 51 Parsons St., West Newton, Mass.
Filed Mar. 31, 1964, Ser. No. 356,280
11 Claims. (Cl. 340—347)

This invention relates in general to angle encoders and more particularly to an electromagnetic wafer angular resolver.

In general an angular resolver is a device which converts the angular position of an input shaft into an output electrical signal. A number of principles have been employed in the construction of such resolvers. Among these principles have been optical interference, magnetic induction and capacitive coupling. Encoders employing the electromagnetic inductive principle employ at least one input coil through which current is passed to produce an alternating magnetic field. This coil is attached to and rotates with the input shaft. A second coil is mechanically secured to a reference element and serves as a pickup coil, that is, the current through this pickup coil is only that induced by the magnetic field variations produced by the first coil. Thus the current through the pickup coil varies according to the orientation between the two coils. An encoder of this type produces an output signal whose amplitude varies with the angular position of the input shaft. Such an arrangement imposes, however, very stringent requirements on the axial displacement between the coils in order that the amplitude of the output signal will provide a precise indication of angular displacement.

A second arrangement of an electromagnetic inductive encoder which obviates the axial displacement difficulties, employs a pair of driving coils attached to the input element and a pair of pickup coils attached to the reference element. In this latter arrangement the coils on the input element are arranged in space quadrature and are excited with electrical signals which are in time quadrature. If the pickup coils are also arranged in space quadrature, then the output signals vary in their phase relationship to the input driving signals, rather than in their amplitude. Since this phase difference is independent of the axial spacing between the coils, then the requirement of stringent axial displacement is eliminated. Systems of this type, however, tend to be very complex in terms both of the driving signal wave generators and in terms of the output circuits capable of providing high resolution for precise angular determinations.

It is, therefore, a primary object of the present invention to provide an angle encoder having an efficient and economical drive signal generating circuit in which angular displacement is indicated by a phase difference.

It is another object of this invention to provide an angle encoder of the electromagnetic inductive type, employing square waves as the driving signals and utilizing a phase locked multiplier loop in the output phase detection circuitry.

It is yet another object of the present invention to provide a shaft angle encoder of the wafer resolver type in which the resolver output signals vary in phase in accordance with variation in input shaft angle and which has an output circuit providing this phase information in precise incremental form and in which the driving signals are low frequency modulations of a high frequency carrier.

It is still another object of this invention to provide a shaft encoder of the wafer resolver type which provides output information of both one speed and $n$ speed rotation.

Broadly speaking, the encoder of the present invention employs as the mechanical elements of the resolver a pair of thin wafer elements. Each of the wafer elements has a printed circuit coil on each surface with the coils arranged in space quadrature with one another. Each of the coils on each of the wafers contains a large number (which may be referred to as $n$) of turns in order to obtain high angular resolution. One of the wafers is fixed to the input shaft and rotates with it, while the other wafer is fixed to a point of mechanical reference. Each of the coils on the wafer fixed to the input shaft are excited with square wave signals in time quadrature. These driving signals are formed from a pair of square waves at carrier frequency that are in phase with one another, with the signals on one coil modulated by a lower frequency square wave which is ninety electrical degrees out of phase with the modulating square wave on the second coil at the same frequency. The pickoff coils (that is, the coils on the wafer fixed to the mechanical reference point) are connected to a phase resolving circuit which includes a phase locked loop for making extremely precise determinations of the phase angle of the output current with respect to the phase of the driving signals. These phase determinations are provided as an output signal either in the form of a direct current level or in terms of the number of zero crossings of the waveform.

Other objects and advantages will become apparent from the following description when taken in conjunction with the accompanying drawings wherein.

Figure 1:
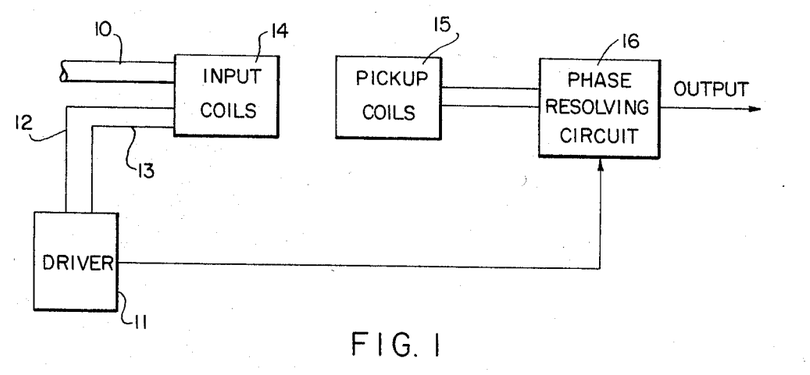
FIG. 1 is an illustration in block diagrammatic form of a shaft angle encoder constructed in accordance with the principles of this invention.

With reference now specifically to FIG. 1, a shaft angle encoder is shown in its simplest logical form as including a driver circuit 11, using a pair of exciting signals in time quadrature on leads 12 and 13, each of which are connected to individual coils in a driver wafer 14. The rotational position of the driver wafer 14 is determined by the rotational position of input shaft 10. As will be explained in further detail below each of the driver coils are arranged on the resolver 14 in space quadrature. A pair of pickup coils arranged in space quadrature are mounted on a pickup wafer 15 which is fixed to a mechanical reference point. The coils on the pickup wafer 15 are electrically connected to phase resolving circuit 16 which provides as an output a signal different in phase from the exciting signals, which phase difference varies with the rotational displacement between the input shaft and the fixed reference point.

If, in this resolver, one of the coils of the driver is excited by a voltage of the general form $E \sin 2\pi f t$ where E is the maximum voltage amplitude and $f$ is the reference carrier frequency and the other coil in space quadrature is excited by a voltage having a form $E \cos 2\pi ft$ then the output from the pickup coils of the resolver will be $e_0 = Et_r \cos(2\pi ft - \theta)$ where $t_r$ is the transformation ratio and where $\theta$ is the angular position of the input shaft with respect to the mechanical reference point. Thus, the output phase shift is a function of the angular rotation of the input shaft with respect to the mechanical reference point. The output portion of the circuitry involves a phase resolving circuit 16 which provides as an output an indication of the phase difference between the input driving signal and the output signal from the pickoff coils. As above indicated, this difference is a direct indication of the amount of rotation of the input shaft 10.

For purposes of clarity the more detailed description of this encoder will be divided into three sections; namely, the mechanical arrangement of the wafers, the driving signal circuitry and the phase resolving circuitry.

*Mechanical arrangement of the wafer elements*

Figure 2:
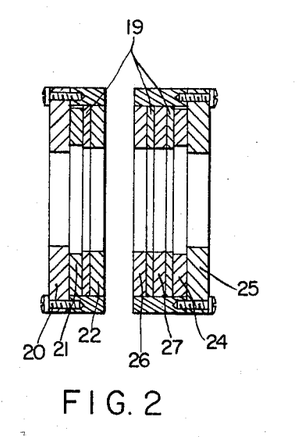
FIG. 2 is an illustration generally in diagrammatic form of the mechanical configuration for a shaft angle encoder constructed in accordance with the principles of this invention.

The physical arrangement of the wafers in both the input section and the pickup section is shown in FIG. 2. The input wafer 22 consists of a disc formed of dielectric material such as fiberglass impregnated with epoxy which has mounted on either side a copper printed circuit usually of a thickness of .0015″. The printed circuit on each side is a complete coil for the drive section with each of the coils arranged in space quadrature. The thickness of the dielectric portion of the wafer would typically be in the order of .005″. The wafer 22 is mounted on a Mumetal ring 21 which is in turn attached to a backing ring 20. The backing ring 20 may be attached either directly to the input shaft or more commonly to a coupling to the input shaft arranged such that the ring rotates directly with rotation of the shaft.

The pickup wafer 26 is similarly formed of a dielectric material with a coil printed on each side and with the coils in space quadrature. The pickup wafer 26 is also mounted on a Mumetal ring 24 which is in turn mounted on a second backing ring 25. The pickup backing ring 25 is attached to some mechanical reference point. In the configuration of discs illustrated in FIG. 2 an additional pickup wafer 27 is shown attached through a Mumetal ring to backing ring 25. This additional pickup wafer provides for one speed output information. That is, it provides one complete electrical cycle for a 360° rotation of the input shaft. As briefly mentioned earlier, the primary pickup wafer 26 has coils with a large number, $n$, of turns thereby providing one complete electrical cycle for each rotation of $360°/n$.

For purposes of electrically isolating the printed circuits from one another and from the Mumetal rings, either the circuits may be coated with an insulating material or insulating wafer 19 may be inserted.

Figure 3:
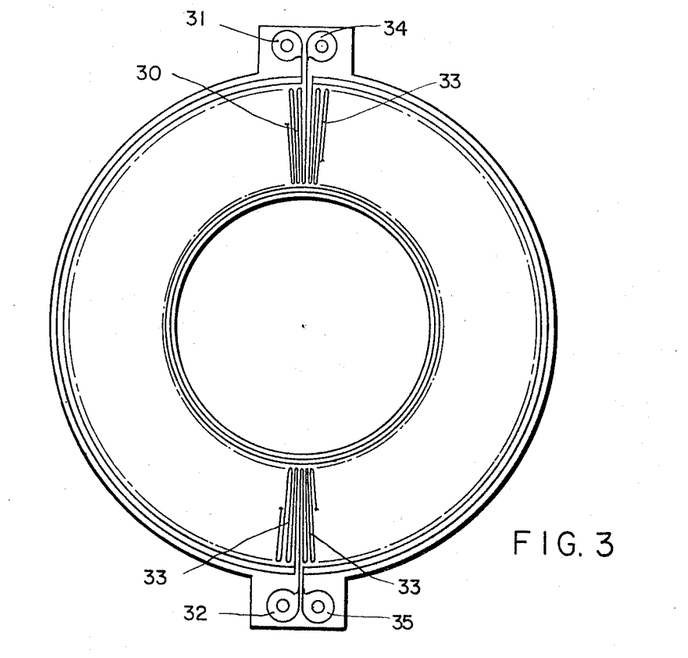
FIG. 3 is an illustration in plan view of one surface of a wafer to be employed in the resolver of FIG. 2.

The configuration of the coils which are formed as copper printed circuits on each side of the input wafer 22 and on the primary pickup wafer 26 is illustrated in FIG. 3. In FIG. 3 the pattern shown is a 360-pole pattern, that is, it has 360 turns on the coil. It will be noted that the circuit shown in FIG. 3 is actually divided into two halves, the left-hand half 30 having terminals at 31 and 32 and the right-hand half 33 having terminals at 34 and 35. As is apparent from inspection of the pattern the current flowing in each of the zig-zag conductors creates a loop which acts in the same way as a single loop on a transformer. Thus, a net coupling is achieved, which is detrimental to the operation of the resolver. This net coupling may be eliminated either by vectorially subtracting the unwanted coupling from an output signal or (perhaps more conveniently) by printing a return wire that will magnetically buck out this unwanted effect. In the resolver illustrated in FIG. 3 only one bucking fringe coil 36 is employed. For a more complete effect, a second fringe coil on the inside perimeter should also be employed. An alternative way of bucking out the net coupling effect is to use a single return wire positioned at the root mean square of the inner and outer radii of the coil turns. In this instance the conductor would be overlaid on but insulated from the coil. When a 360-pole pattern, as illustrated, is used with the driver and pickup coils formed of printed circuits a resolution without interpolation of one minute of arc may be obtained. If, in addition, a high resolution resolving circuit is employed on the output signal from the pick-up resolver, resolutions in the order of five seconds of arc may be achieved.

Figure 4:
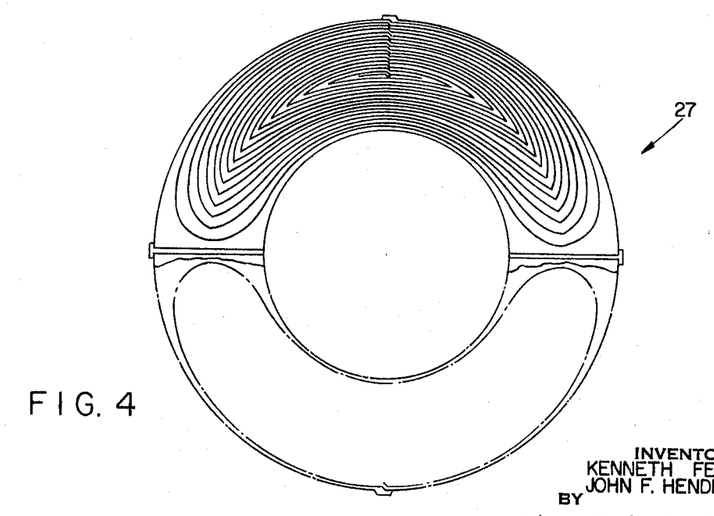
FIG. 4 is an illustration in plan view of a second type of wafer to be employed as a one speed pickoff element in the encoder illustrated in FIG. 2.

The pattern of the coil for the one-speed disc 27 is illustrated in FIG. 4. Since the disc is symmetrical the pattern is shown only on one half. It will be understood that the opposite half is identical with that shown. This disc is used as an auxiliary for deriving one speed information from the resolver. Thus, the electrical current through the coil on this auxiliary disc 27 has a different phase value, with respect to the phase of the driving signals on the driving coils, for each amount of rotation of the input shaft up to 360°. The addition of an auxiliary resolver disc such as the disc 27 provides that the resolver itself provides both one speed and $n$ speed output information from a single pair of driving coils. In order to obtain the one speed information the driving signal applied to the coils on the driving wafer 22 is split so that the signals applied to the left half 30 are opposite in polarity to the signals applied to the right half 33. When it is desired to operate the resolver to produce only $n$ speed information, these two halves 30 and 33 may be serially connected.

The patterns illustrated in FIG. 3 are repeated both on the opposite surface of the disc 22 and on both surfaces of the pickup disc 26.

Thus, both the drives and pickup wafers are identical and therefore interchangeable. If it is desired, a pickup wafer having only one coil may be employed, without loss of resolution. The amplitude of the output signal thus derived will, however, be smaller than the sum of the signals obtained from a pair of pickoff coils.

It may also be desired to obtain information which is intermediate $n$ speed and one speed information. Thus $n/4$ speed information can be obtained by using a pickup coil such as that shown in FIG. 3 but divided into four segments rather than two, with each coil presenting an independent output. One advantage of such low frequency information is that if there is occasional short duration blanking of the output signals from the overall system, thus deleting some of the $n$ speed information, the low speed information may allow the lost increments to be reconstructed provided that the blanking is not long enough to also delete the low speed increments.

*Driving signal circuitry*

Figure 5:
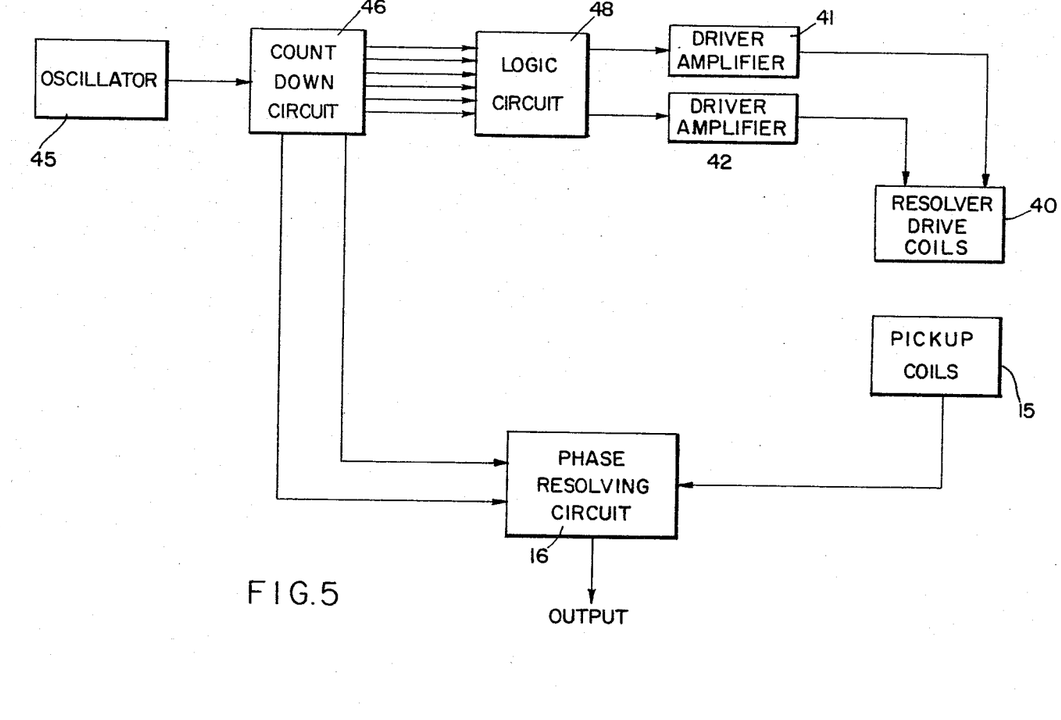
FIG. 5 is an illustration in block diagrammatic form of the circuitry of a shaft angle encoder constructed in accordance with the principles of this invention.

In FIG. 5 a detailed diagram of the overall circuitry is shown. The resolver driving coils 40 are, as previously described, physically displaced by 90° and each receives an input from one of the two driving amplifiers 41 and 42. Each of the driver signals includes a square wave at a relatively low frequency such as 4 or 5 kc. with the square wave signal from driving amplifier 41 being 90° out of phase electrically with the square wave from driving amplifier 42. The fundamental components of these two driving signals then bear a sine-cosine relationship in this low frequency aspect. For convenience of notation the time displaced square wave will be referred to as being 90° phase displaced. For purposes of transmission of the signals either to the driver coils or from the pickup coils the low frequency square waves are used to modulate a high frequency carrier square wave. One advantage of the high frequency carrier lies in the fact that the low frequency modulations are now applied to the resolver coils at a high frequency. Since the resolver coils form essentially an air core transformer, its higher frequency response is better than its low frequency response. Use of the high frequency carrier permits in many instances the removal of the Mumetal ring on the pickoff coil.

The driver signals for drivers 41 and 42 are derived from a series of elements which include an oscillator 45, a countdown circuit 46 coupled to the output of the oscillator 45 and a logic circuit 48 coupled to a series of outputs from the countdown circuit 46. The oscillator 45 provides a high frequency input to the countdown circuit 46 which then divides down by means of a series of flip-flops the oscillator output into a group of suboscillator frequency outputs. By appropriate arrangement of the logic of the flip-flops these sub-frequency outputs can bear a selected phase relationship such as zero, 180° and 90°, to the original square wave. In addition, by selecting a high enough frequency for the oscillator 45 a common carrier frequency may also be generated from the countdown circuit 46. A suitable value for the carrier frequency might be 96 kc. with a suitable modulating wave frequency being in the order of 4.8 kc. One of the driving amplifiers then should have a signal output at a carrier frequency of approximately 96 kc. modulated by a 4.8 kc. modulation wave at 0° reference phase while the other driving amplifier should have the same carrier frequency modulated in this instance by 4.8 kc. with a 90° phase reference.

Modulation of a high frequency square wave by a low frequency square wave can be accomplished by using logic circuits to synthesize the wave. Thus, considering the synthesis of a modulated square wave C from a pair of input square waves A and B, the output waveform may be expressed as $C = \overline{AB} + AB$ where $\overline{A}$ and $\overline{B}$ are the complementary values of A and B in binary notation. The truth table below illustrates this point for the synthesis of two square waves, one of which is double the frequency of the other.

| A | B | C |
|---|---|---|
| 0 | 0 | 1 |
| 0 | 1 | 0 |
| 1 | 0 | 0 |
| 1 | 1 | 1 |

Figure 6:
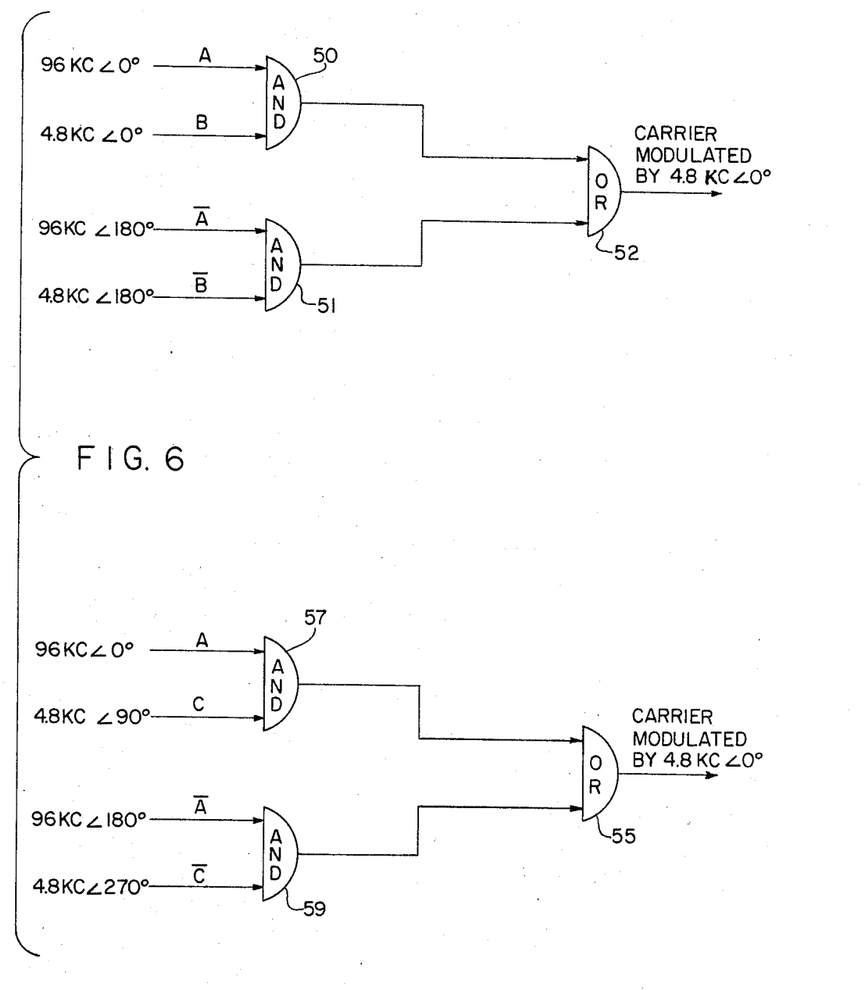
FIG. 6 is an illustration in block diagrammatic form of logic circuitry suitable for use as the logic circuit elements illustrated in FIG. 5.

In FIG. 6 there is shown a logic circuit for generating from appropriate square wave inputs, outputs suitable for driving the driving amplifiers 41 and 42. As previously noted, the signals from one driver should represent the carrier square wave modulated by a low frequency square wave, while the signal from the other driver should represent the same carrier wave modulated by a low frequency square wave 90° out of phase. In the logic system illustrated a pair of AND gates 50 and 51 have their outputs coupled to the input of an OR gate 52. The output of OR gate 52 provides the 0° phase reference output. The inputs to AND gates 50 include the 96 kc. carrier frequency at 0° phase reference and the 4.8 kc. modulating frequency at 0° phase reference. The inputs to AND gate 51 include the carrier frequency at 180° phase reference and the modulating frequency at 180° phase reference. Under these circumstances the output square wave from the OR gate 52 has an average D.C. value of zero at a reference phase angle of zero degrees. The other portion of the logic circuit includes the second OR gate 55, the inputs for which are provided from a pair of AND gates 57 and 59. The inputs to AND gate 57 include the 96 kc. carrier frequency at 0° phase reference angle and the 4.8 kc. modulating frequency at 90° reference phase angle. The input to the AND gate 59 includes the carrier frequency at 180° phase reference angle and the modulating frequency at 270° phase reference angle. The output of OR gate 55 then is 96 kc. carrier wave varying in amplitude about a D.C. level of zero and modulated by a 4.8 kc. modulation wave with a phase reference angle of 90°. The outputs from these two OR gates are then suitable signals for operating driving amplifiers 41 and 42 respectively. The drive circuits themselves provide for power amplification and are formed of conventional amplifiers.

In order to obtain the inputs to the logic circuit indicated in FIG. 6, the countdown circuit 46 operating on the output of the oscillator must provide the carrier frequency at zero and 180° phase reference and also the modulation frequency at zero, 90°, 180° and 270° phase reference. Another output frequency intermediate the modulating frequency and the carrier frequency is also required at both 0° and 90° relative phase as a reference for the phase resolving circuit.

Figure 7:
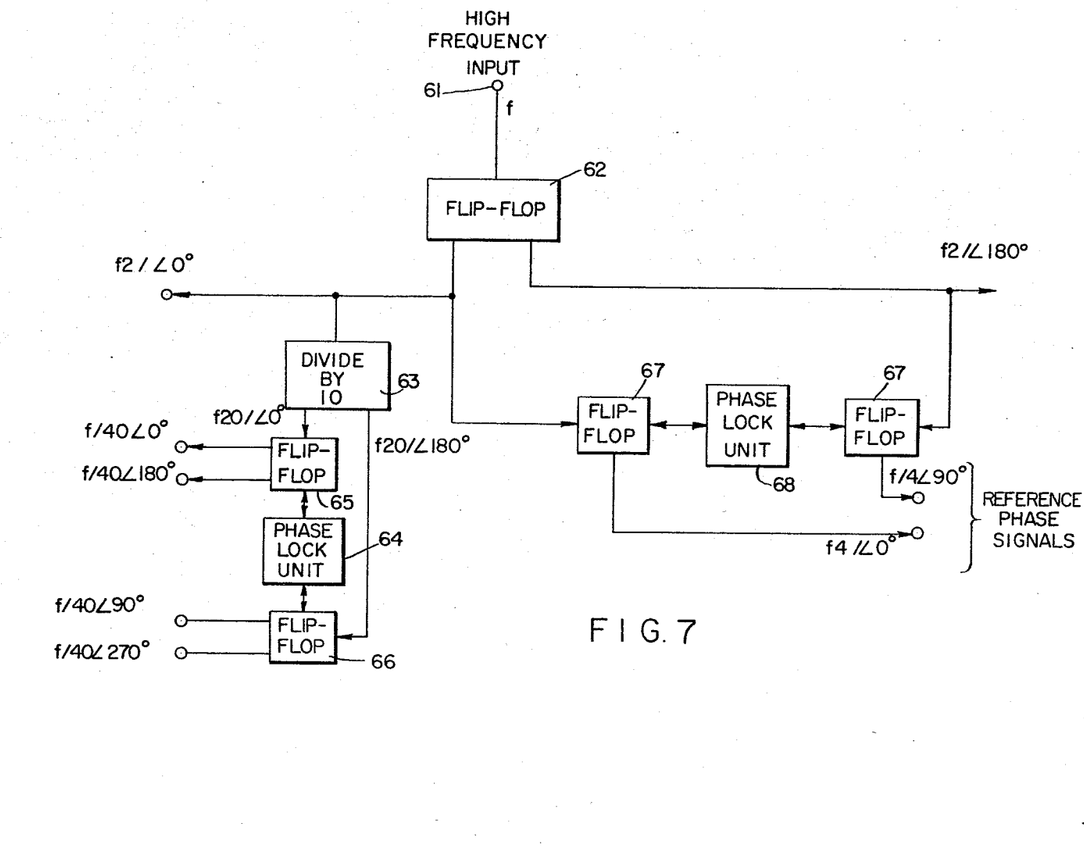
FIG. 7 is an illustration in block diagrammatic form of circuitry for producing the driving signals for a shaft angle encoder constructed in accordance with the principles of this invention.

A countdown circuit suitable for providing these square wave outputs in these relationships is illustrated in FIG. 7.

The input to this countdown circuit is supplied at input 61 and this input wave is assumed to have a fixed high frequency. The input may either be a series of oscillator pulses or a square wave. A typical frequency value for this input is 192 kc. This input is applied to a flip-flop unit 62 which itself provides two outputs. One output is a square wave at a frequency $f/2$ and bears a phase rotation of 0° phase shift while the second output, which is also at a frequency of $f/2$, is at a 180° phase shift from the first output. The flip-flop 62 may be any conventional bistable unit providing an output on one terminal when the flip-flop goes from the "off" to the "on" state and on the other terminal when the flip-flop goes from the on to the off state. The 0° reference output from flip-flop 62 is applied to the input of a decimal divider 63 and to flip-flop 67, while the 180° out of phase $f/2$ output from flip-flop 62 is provided to flip-flop 69. The decimal divider can be any conventional scaling unit for dividing the frequency by 10 and providing two 180° out of phase outputs.

The first output of the decimal divider 63 is supplied to a flip-flop 65 which in turn provides, on a pair of outputs, square waves separated in phase by 180° and at a frequency which is one-half of the frequency to the flip-flop. The two outputs from flip-flop 65 are then at a frequency equal to $f/40$ with one at 0° phase reference and the other at 180° phase reference. The second output from the decimal divider 63 is coupled to flip-flop 66 which operates in precisely the same fashion as flip-flop 65. The outputs, therefore, from flip-flop 66 represent a square wave at frequency $f/40$ with a phase angle of 270° and a square wave at frequency $f/40$ with a phase angle of 90°. The flip-flop 65 and 66 are locked together by phase lock 64. The phase lock unit 64 is a conventional means for assuring that flip-flops stay in the fixed relationship to one another.

The flip-flops 67 and 69 to which are applied the $f/2$ at 0° phase reference and $f/2$ at 180° phase reference signals respectively, are also locked together in phase by a second phase lock unit 68. The output from flip-flop 67 is at a frequency at $f/4$ and a relative phase angle of 0°, while the output from flip-flop 69 is at the same frequency but displaced in phase by ninety electrical degrees. The function of these $f/4$ outputs as reference phase signals will be described with respect to the description of the phase resolving circuitry.

While the circuitry of FIG. 7 has been described with reference to generating a high frequency carrier output and low frequency modulation output as well as an intermediate frequency reference phase outputs, the same basic system may be employed when there is no high frequency carrier being used. In such an arrangement the initial frequency need not be as high, but rather need only be sufficiently high to generate a pair of phase reference signals 90° out of phase which are some integer multiple higher in frequency than the driving signals to be applied to the driving input coils. The signals to the input coils must be, however, in substantially 90° phase displacement.

Phase resolving circuitry

Figure 8:
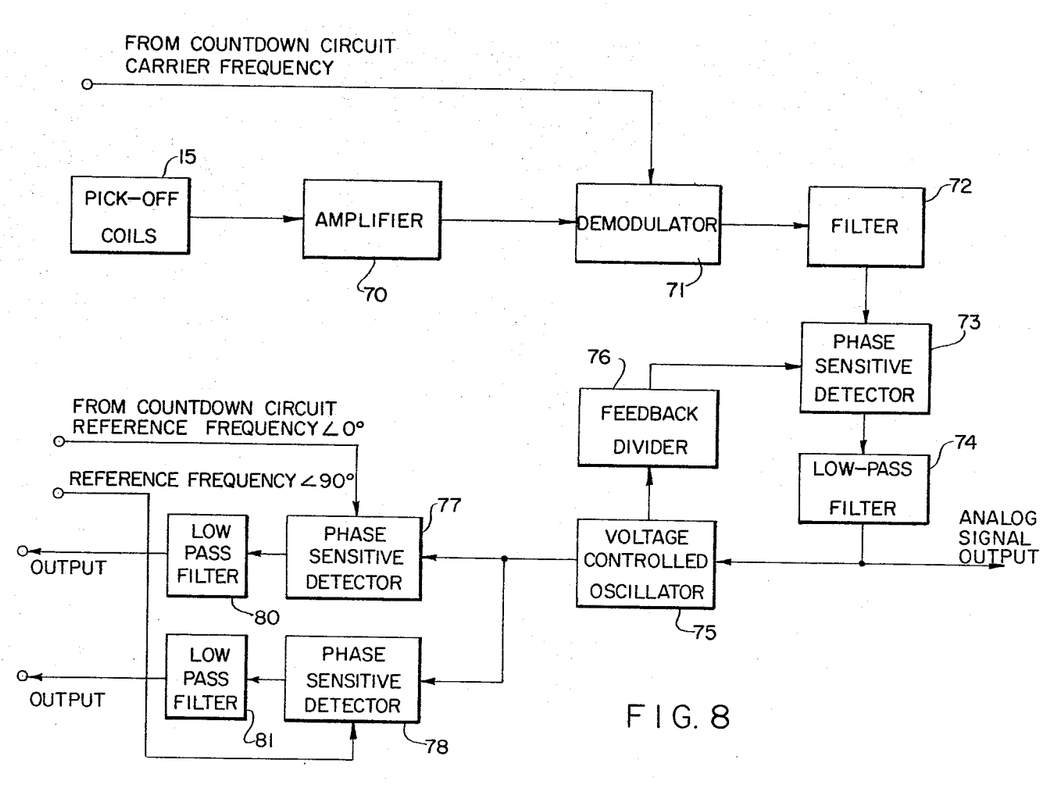
FIG. 8 is an illustration in block diagrammatic form of the output phase resolving circuitry suitable for use in the circuit arrangement illustrated in FIG. 5.

The function of the phase resolving circuitry which has been generally indicated in FIG. 5 as unit 16 is to provide an output indication which varies with the phase difference between the input driving signals and the output signals at the modulating frequency which appear on the pick-up coils. A suitable arrangement for phase resolving circuitry is illustrated in FIG. 8. The pickoff coils 15 are connected to an amplifier 70 which is a conventional power amplifier. The coils may be connected either providing the sum of the outputs from the two coils or the output from one coil to the amplifier. The output from the amplifier 70 is applied directly to a demodulator unit 71 to which is also applied from the countdown circuit the carrier frequency at 0° phase reference. While the demodulator 71 may take any of several conventional forms a convenient form for use with square waves is that of a linear multiplier. The output from the demodulator 71 contains essentially two components. One being the sum of the two input frequencies which is substantially twice the carrier frequency while the other component is the difference frequency which will be substantially the modulating frequency. A filter unit 71 removes the higher frequency component allowing only the difference signal to be coupled to phase sensitive detector 73. The phase sensitive detector 73 is coupled with a filter 74, a voltage controlled oscillator 75 and a feedback divider 76 in a phase locked loop. The output of the phase sensitive detector 73 is coupled through the low pass filter 74 to the controlling input of voltage controlled oscillator 75. The voltage controlled oscillator may be any convenient voltage controlled oscillator (VCO) having, however, a central frequency which is an integer multiple of the modulating frequency which is applied as the driving signal to the input coils. The feedback divider 76 then divides down the output from the voltage controlled oscillator 75 by a factor equal to this integer multiple and provides the divided down value as the second input to the phase sensitive detector 73. Under these conditions the output from the voltage controlled oscillator 75 is a signal at a frequency which is a multiple of the driving signal frequency applied to the input coils and which has, therefore, a phase difference which is a multiple of the phase difference between the signals from the pickup coils and the driving coils. The phase sensitive detector 73 may be any of several conventional forms of phase sensitive detector, a useful form being a linear multiplier. In the instance where the phase sensitive detector 73 is a linear multiplier then one of the two inputs must be sinusoidal in form. One manner in which this may be accomplished is to utilize a VCO which provides a sinusoidal output and a feedback divider which accepts a sinusoidal input and again provides a frequency divided sinusoidal output. If on the other hand the VCO or the feedback divider provides a square wave output a filter may be inserted between the divider 76 and the phase sensitive detector 73 to obtain the necessary sinusoidal waveform. Alternatively, a filter may be inserted between the separating filter 72 and the phase sensitive detector 73 to provide a sinusoidal waveform.

The output at the high frequency level on the voltage controlled oscillator 75 is applied to the input of a pair of phase sensitive detectors 77 and 78. Phase sensitive detector 77 has applied to it, as a second input, a signal from the countdown circuit at the reference frequency and 0° phase angle. The reference frequency is, as noted previously, at a frequency level which is the same multiple higher than the driving signal frequency as is the output from the voltage controlled oscillator 75. A second input to the phase sensitive detector 78 is also supplied from the countdown circuit and is at the reference frequency with a phase angle of 90°. The outputs from each of the phase sensitive detectors 77 and 78 are coupled to low pass filters 80 and 81 respectively. The outputs of the filters are triangle waves which are out of phase by 90° and the D.C. levels of these outputs are indicative of the phase difference between the driving signals applied to the input coils at the modulating frequency and the signals on the pick-up coils at that same frequency. Since the outputs from filters 80 and 81 are 90° out of phase then the direction of rotation of the coils with respect to one another is indicated by the respective lead or lag between these two outputs. The outputs from filters 80 and 81 are proportional to the increment of the integrated motion between the two sets of coils. Various level slicing techniques may be utilized in this output to provide, for example, an indication of zero crossings and thereby a digital output. Because the outputs of the low pass filters 80 and 81 are triangle waves with substantially linear slopes, greater incrementing may be obtained by use of several level slices set at prescribed incremental levels. A second output from the phase resolving circuitry may be taken from the output of the low pass filter 74, from which may be extracted an analog signal which is proportional to the instantaneous motion between the input coils and the pickoff coils.

While the system of this phase resolver has been described generally in terms of a high frequency carrier and specifying particular frequencies for the carrier and drive signals, it should be understood that the system may also be operated without the high frequency carriers and over a wide range of different selected frequencies.

The invention having been described, various modifications and departures will now occur to those skilled in the art and the invention discussed herein should be construed as limited only by the spirit and scope of the appended claims.

What is claimed is:

1. An angle resolver comprising a pair of input coils fixed in space quadrature with one another; a pick-up coil mounted on an element which is rotatable with respect to said pair of input coils; drive signal means for applying to one of said coils in said input pair a square wave at a predetermined frequency and amplitude and for applying to the other of said pair of input coils a square wave at said same predetermined frequency and amplitude but displaced in phase by ninety electrical degrees; and phase detector means coupled to said pickup coil and said drive signal means for providing an output signal indicative of the phase difference between said square wave signals at said predetermined frequency applied to said input coils and signals at said same predetermined frequency on said pickup coil.

2. An angle resolver comprising a first disc formed of electrically insulating material, a first coil printed on one surface of said first disc, said first coil having a predetermined number of turns, a second coil printed on the opposite surface of said first disc and fixed in space quadrature with said first coil, said second coil having the same number of turns as said first coil; a second disc formed of electrically insulating material, a third coil printed on one surface of said second disc, said third coil having the same number of turns as said first coil and a fourth coil printed on the opposite surface of said second disc in space quadrature with said third coil, said fourth coil having the same number of turns as said third coil, said first and said second discs being concentrically mounted and relatively rotatable with respect to one another, drive signal means for applying to said first coil a signal including a square wave component at a first predetermined frequency and for applying to said second coil a signal including a square wave at said same first predetermined frequency but displaced ninety electrical degrees in phase from said square wave applied to said first coil; phase detector means connected to one of said third and fourth coils and to said drive signal means for providing an output signal indicative of the difference in phase between the square wave component at said first predetermined frequency of said signals applied to said first and second coils and the signals of said first predetermined frequency on said third and fourth coils.

3. Apparatus in accordance with claim 2 and including a third disc mounted concentric with said first and said second discs, said third disc being fixed to rotate with said second disc, a fifth coil printed on said third disc, said fifth coil being patterned such that its output electrical signal completes one electrical cycle for each 360° resolution of said third disc.

4. An angle resolver comprising a pair of input coils fixed in space quadrature with one another; a pickup coil mounted on an element which is rotatable with respect to said pair of inputs coils; drive signal means for applying to one of said coils in said input pair a signal including a square wave component at a first predetermined frequency and for applying to the other of said pair of input coils a signal including a square wave component at the same first predetermined frequency but displaced in phase by ninety electrical degrees; and phase detector means coupled to said pickup coil and said drive signal means for providing an output signal indicative of the phase difference between said square wave components at said first predetermined frequency applied to said input coils and signal components at said same first predetermined frequency on said pickup coil.

5. Apparatus in accordance with claim 4 wherein said phase detector means includes a phase locked loop comprising a phase sensitive detector coupled to said pickup coil, a voltage controlled oscillator adapted to oscillate at a central frequency which is an integer multiple of said first predetermined frequency, a low pass filter coupling the output of said phase sensitive detector to the control input of said voltage controlled oscillator, divider means connected to the output from said voltage controlled oscillator and having a dividing factor equal to said integer multiple and means for applying said divided oscillator output as a second input to said phase sensitive detector; and wherein said drive signal means provides as additional output a pair of reference signals including square wave components displaced in phase from one another ninety electrical degrees at a frequency equal to the central frequency of said voltage controlled oscillator, said phase detector means further including a second phase sensitive detector having coupled to it as one input the undivided output from said voltage controlled oscillator and as a second input said drive signal reference square wave at 0° relative phase, the output from said second phase sensitive detector providing an output indication of the difference in phase between said square wave component of said driving signal at said first predetermined frequency and the component of said pickup coil signal at said same first predetermined frequency.

6. Apparatus in accordance with claim 5 and including a third phase sensitive detector having coupled to it as one input the undivided output from said voltage controlled oscillator and as a second output said drive signal reference square wave at 90° relative phase.

7. An angle resolver comprising, a pair of input coils fixed in space quadrature with one another; a pickup coil mounted on an element which is rotatable with respect to said pair of input coils; drive signal means, said drive signal means providing to one coil in said pair of input coils a first drive signal formed of a square wave at a first predetermined frequency modulated by a square wave at a second predetermined frequency, said second predetermined frequency being lower than said first predetermined frequency, said drive signal means applying to said other one of said input pair of coils a second drive signal formed from a square wave at said first predetermined frequency modulated by a square wave at said second predetermined frequency where said square wave at said second predetermined frequency is displaced ninety electrical degrees from said second predetermined frequency square wave applied to said first one of said pair of input coils; and phase detector means coupled to said pickup coils and said drive signal means for providing an output signal indicative of the phase difference between the square wave component at said second predetermined frequency applied to said input coils and the signal at said second predetermined frequency on said pickup coil.

8. Apparatus in accordance with claim 7 wherein said drive signal means includes a high frequency source and countdown means coupled to said high frequency source, said countdown means having,
 (a) as a first signal output a square wave at said first predetermined frequency,
 (b) as a second signal output a square wave at said first predetermined frequency 180° displaced from said first signal output,
 (c) as a third signal output a square wave at said second predetermined frequency,
 (d) as a fourth signal output a square wave at said second predetermined frequency, but displaced 90° in phase from said third signal output,
 (e) as a fifth signal output a square wave at said second predetermined frequency displaced 180° in phase from said third signal output, and
 (f) as a sixth signal output a square wave at said second predetermined frequency displaced 180° in phase from said fourth signal output;
said drive signal means further including signal mixing means coupled to said six signal outputs and providing said first and second drive signals to said pair of input coils.

9. Apparatus in accordance with claim 8 wherein said signal mixing means comprises first and second AND gates; a first OR gate, the output of said first and said second AND gates being coupled to the inputs of said first OR gate, the output of said first OR gate being provided as the driving signal to the first one of said pair of input coils, the inputs to said first AND gate being taken from said first and said third signal outputs from said countdown means and the inputs to said second AND gate being taken from said second and fifth signal outputs from said countdown means, said signal mixing means further including third and fourth AND gates and a second OR gate, the output from said third and fourth AND gates being coupled as inputs to said second OR gate, the output from said second OR gate being coupled as a driving signal to the second one of said pair of input coils, the inputs to said third AND gate being taken from said first and said fourth signal outputs from said countdown circuit and the inputs to said fourth AND gate being taken from said second and said sixth signal outputs from said countdown circuit.

10. Apparatus in accordance with claim 7 wherein said phase detector means includes a demodulating means having as one input the signals from said pickup coil and as a second input an output from said drive signal means carrying said first predetermined frequency square wave, and a phase sensitive detector coupled to the output from said modulating means for providing an output indication of the phase difference between the square wave components at said second predetermined frequency applied to said input coils and the signals on said pickup coils at said second predetermined frequency.

11. An angle resolver comprising a first disc formed of electrically insulating material, a first coil printed on one surface of said first disc, said first coil being formed of a plurality of segments, each of said segments having the same predetermined number of turns therein, a second coil identical with said first coil said second coil being printed on the opposite surface of said first disc and fixed in space quadrature with said first coil; a second disc formed of electrically insulating material with a third coil printed on one surface of said disc, said third coil being identical with said first coil and a fourth coil printed on the opposite surface of said second disc in space quadrature with said third coil, said fourth coil being identical with said third coil, said first and said second discs being concentrically mounted and relatively rotatable with respect to one another; drive signal means for applying to alternate segments of said first coil a signal of a first plurality including a square wave component at a first predetermined frequency and for applying to the remainder of the segments of said first coil a square wave of the opposite polarity at the same predetermined frequency, and further for applying to alternate segments of said second coil a signal at said first polarity including a square wave and at said same first predetermined frequency and for applying to the remainder of said segments of said second coil a signal of the opposite polarity including a square wave at said same first predetermined frequency, said square waves at said first predetermined frequency which are included in the signals applied to said second coil being displaced ninety electrical degrees in phase from the signals applied to said first coil; and phase detector means connected to said third and fourth coils and to said drive signal means for providing an output signal having a first component indicative of the difference in phase between the square wave component at said first predetermined frequency of said signals applied to said first and second coils and the signals of said first predetermined frequency on said third and fourth coils with a cyclic repetition rate equal to said predetermined number of turns included in all of said segments on each of said coils, said drive signal means providing a second component of said output signal indicating the same phase difference at a cyclic repetition rate equal to the number of said segments including any one of said coils.

No references cited.

MAYNARD R. WILBUR, *Primary Examiner.*

A. NEWMAN, *Assistant Examiner.*